United States Patent [19]

Kyogoku et al.

[11] Patent Number: 4,597,288
[45] Date of Patent: Jul. 1, 1986

[54] BAROMETER

[75] Inventors: Hideaki Kyogoku; Fujio Tamura, both of Tokyo, Japan

[73] Assignee: Seiko Instruments & Electronics Ltd., Tokyo, Japan

[21] Appl. No.: 715,496

[22] Filed: Mar. 25, 1985

[30] Foreign Application Priority Data

Mar. 26, 1984 [JP] Japan .................... 59-58032
Jun. 25, 1984 [JP] Japan .................... 59-130676

[51] Int. Cl.⁴ ............................................. G01L 9/00
[52] U.S. Cl. .................................... 73/384; 73/703; 73/DIG. 4; 310/318; 310/338
[58] Field of Search ............... 73/703, DIG. 4, 384, 73/708, 722, 728, 386, 387; 310/338, 318, 319

[56] References Cited

U.S. PATENT DOCUMENTS 3,541,849 11/1970 Corbett .......................... 73/517 AV
4,490,606 12/1984 Lockett et al. ................ 73/728

FOREIGN PATENT DOCUMENTS 0136131 8/1982 Japan ............................ 73/384

OTHER PUBLICATIONS

Review of Scientific Instruments, vol. 33, No. 1, Jan. 1962, pp. 47–49.

*Primary Examiner*—Donald O. Woodiel
*Attorney, Agent, or Firm*—Robert E. Burns; Emmanuel J. Lobato; Bruce L. Adams

[57] ABSTRACT

The present invention provides a barometer which includes a frequency control circuit connected to the input of the piezoelectric oscillator, a current-voltage converter connected to the output of the piezoelectric oscillator, a phase comparator connected to the output of the frequency control circuit and to the output of the current-voltage converter, a voltmeter connected to the current-voltage converter, a voltmeter connected to the phase comparator, a low-pass filter connected to the phase comparator, and input means for applying the output of the low-pass filter to the frequency control circuit. In the construction described above, the ambient pressure of the gas around the piezoelectric oscillator is represented by the a.c. voltage value of the piezoelectric oscillator.

3 Claims, 7 Drawing Figures

BAROMETER

BACKGROUND OF THE INVENTION

This invention relates to a barometer utilizing a piezoelectric oscillator.

It is known that the a.c. voltage of a piezoelectric oscillator which is disposed inside a pressure vessel and causes bending oscillation at a series resonant frequency, changes with pressure as shown in FIG. 2. Therefore, if this a.c. resistance value is known, the pressure corresponding to the resistance value can be known.

Various methods of measuring the a.c. resistance value are known, and a typical example is shown in FIG. 3. An oscillator 1 generates an a.c. voltage $e_s$ of a frequency f. Reference numerals 2 and 3 represent an element to be measured and an amplifier, respectively. They constitute a current-voltage converter together with a feedback resistor $R_F$, and the output voltage of the converter is $e_o$. The amplifier is selected so that a current $i_x$, flowing through the element to be measured, and a current $i_F$, flowing through the feedback resistor, are equal. According to this system, the a.c. resistance $Z_x$ of the element to be measured is determined by the equation (1):

$$Z_x = R_F(e_s/e_o) \tag{1}$$

OBJECT OF THE INVENTION

However, when a piezoelectric oscillator is used as the sensor of a voltmeter in the prior art construction described above, the resonant frequency of the piezoelectric oscillator changes with pressure as shown in FIG. 4. If the system shown in FIG. 3, which is a typical conventional construction, is used, the frequency of the oscillator 1 must always search out the resonant frequency to effect measurement, and this is very troublesome and time-consuming.

DETAILED DESCRIPTION OF PREFERRED EMBODIMENTS OF THE INVENTION

Hereinafter, a preferred embodiment of the barometer of this invention will be described in detail with reference to the accompanying drawings.

Figure 1:
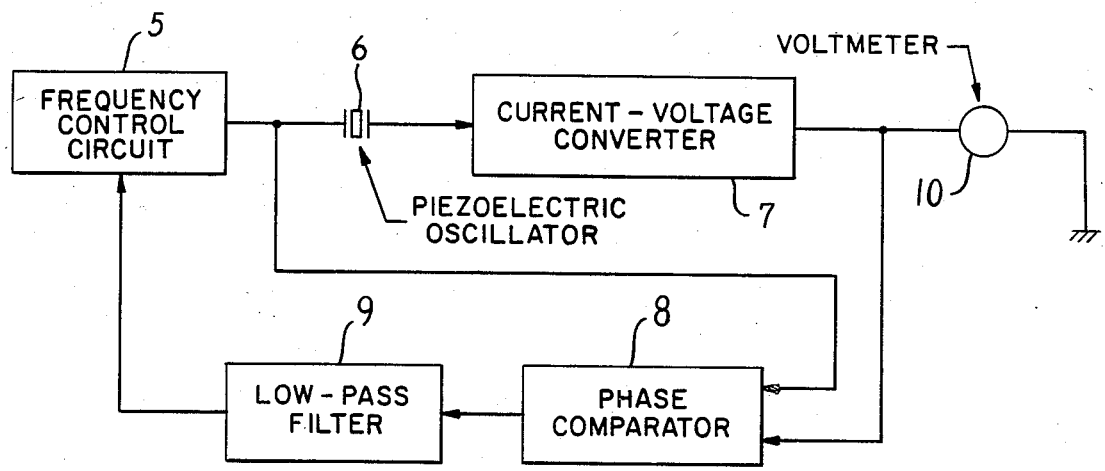
FIG. 1 is a circuit block diagram showing a barometer in accordance with the present invention.
Figure 2:
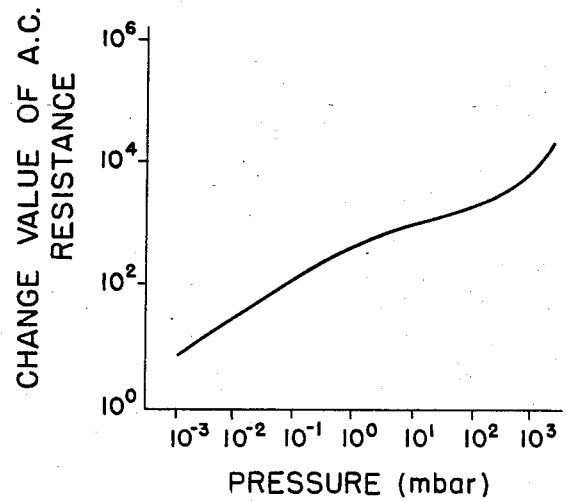
FIG. 2 is a diagram showing an a.c. resistance -v- pressure curve of an ordinary piezoelectric oscillator.
Figure 3:
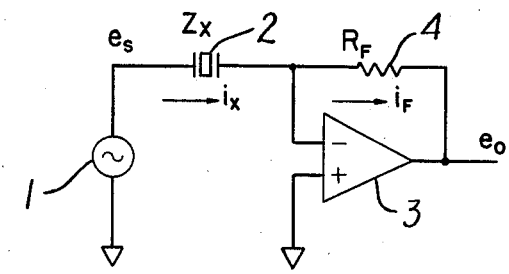
FIG. 3 is a circuit diagram showing a prior art current-voltage conversion circuit.
Figure 4:
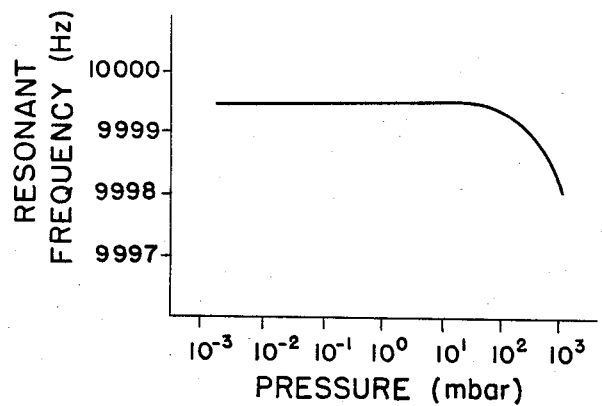
FIG. 4 is a diagram showing the pressure dependence of the resonant frequency of an ordinary piezoelectric oscillator.

FIG. 1 is a circuit diagram showing the barometer in accordance with the present invention. Reference numeral 5 represents a frequency control circuit such as a voltage control oscillator which is capable of changing said frequency. The variable frequency range of this frequency control circuit 5 is wider than the shift of the resonant frequency within the pressure range to be measured by the piezoelectric oscillator 6. The output from the frequency control circuit 5 is applied to the piezoelectric oscillator 6, and the output of this oscillator 6 is applied to a current-voltage converter 7. The current-voltage converter 7 generates a voltage proportional to a current flowing through the piezoelectric oscillator 6.

Figure 5:
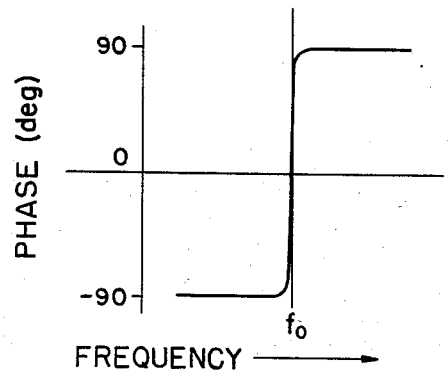
FIG. 5 is a diagram showing the phase of the impedance of an ordinary piezoelectric oscillator.

The phase characterstics of the a.c. resistance of the piezoelectric oscillator 6, that is, the impedance, is zero (degrees) at the resonant frequency $f_o$ as shown in FIG. 5. Therefore, the phase characteristics of the output voltage of the frequency control circuit 5 are the same as those of the output voltage of the current-voltage converter 7 at the resonant frequency $f_o$, but the voltage of the current-voltage converter 7, having the same phase as the current flowing through the piezoelectric oscillator 6, lags behind the output voltage of the frequency control circuit 5 at frequencies lower than the resonant frequency.

Therefore, a phase comparator 8 detects the phase difference between the output voltage of the frequency control circuit 5 and the output voltage of the current-voltage converter 7. The phase comparator 8 generates a voltage proportional to the phase difference. This output voltage is in turn applied to a frequency control terminal of the frequency control circuit 5, and a feedback loop is formed so that the frequency of the voltage applied to the piezoelectric oscillator 6 always coincides with the resonant frequency. Reference numeral 9 represents a low-pass filter which is connected to the phase comparator 8. Normally, the low-pass filter 9 is disposed so as to eliminate the high frequency component (noise) of the output of the phase comparator 8 and to stabilize the system.

The output of the current-voltage converter 7 can be expressed by the following equation (2) from equation (1) above:

$$I_o = I_s \cdot R_F/Z_x \tag{2}$$

Since the circuit is constructed so that $e_s$ is always constant and since $R_F$ is resistance, the product $e_s \cdot R_F$ is a constant ($e_s \cdot R_F = K$), and $I_o$ is given by equation (3) with the reciprocal of the impedance $Z_x$ being the admittance $Y_x$:

$$I_o = K \cdot Y_x \tag{3}$$

If this output is applied to the voltmeter 10, the admittance proportional to the pressure can be known; hence, a barometer detecting the pressure can be constituted.

Figure 6:
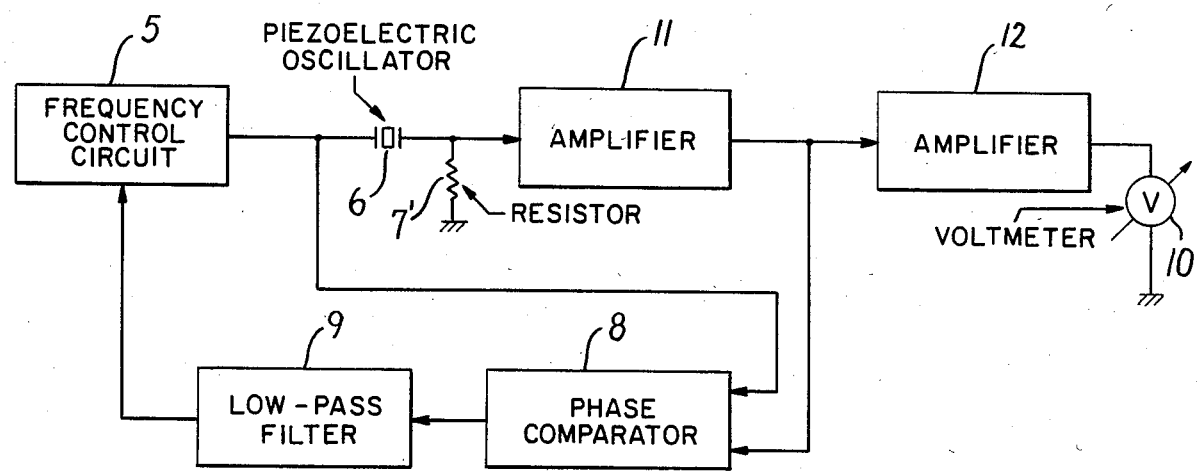
FIG. 6 is a circuit block diagram showing the barometer in accordance with another embodiment of the invention.

FIG. 6 shows another embodiment of the present invention. Reference numeral 7' is a resistor connected in series with the piezoelectric oscillator 6, and the current at resonance flowing through the piezoelectric oscillator generates a potential across the resistor 7' when it flows through said resistor. Reference numeral 11 represents an amplifier which amplifies the terminal voltage of the resistor 7' to a necessary level. A part of the output voltage of the amplifier 11 is applied to the phase comparator 8 while another is applied to an amplifier 12. The terminal voltage of the resistor is further amplified by this amplifier 12 and deflects the pointer of the voltmeter 10. Since the deflection angle of the pointer of the voltmeter is proportional to the current of the piezoelectric oscillator at resonance, the gas pressure around the piezoelectric oscillator can be known from the deflection angle of the pointer. Though not described in detail in this embodiment, a d.c. voltmeter or a d.c. ammeter can of course be used economically if a rectification circuit is disposed inside the amplifier 12.

Figure 7:
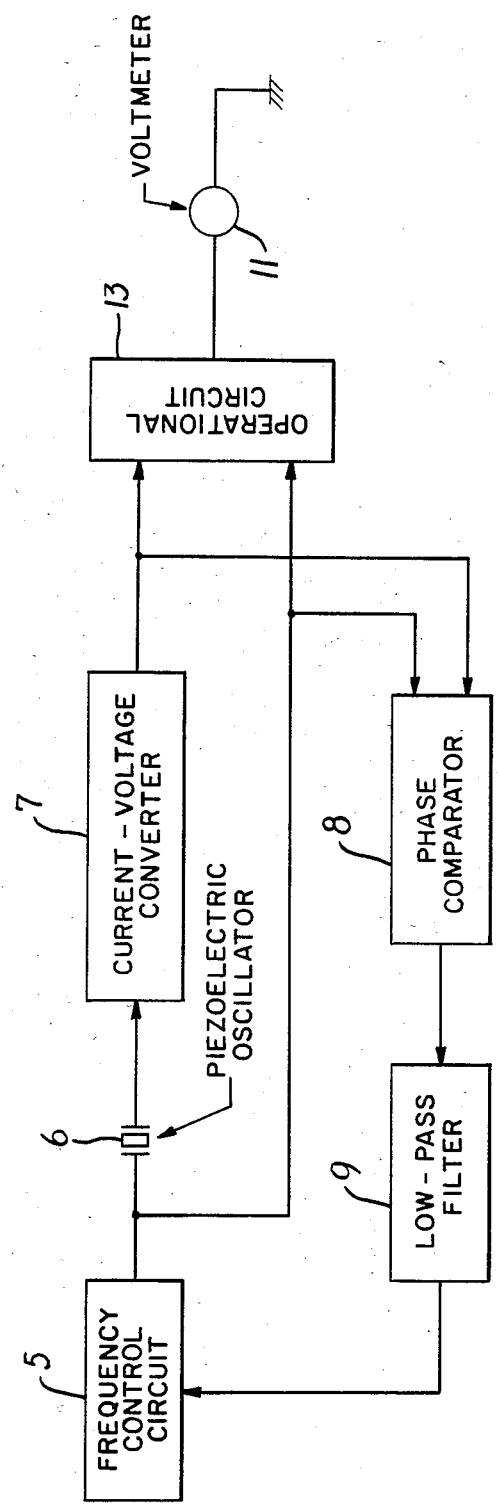
FIG. 7 is a circuit block diagram showing the barometer in accordance with another embodiment of the invention.

FIG. 7 shows another embodiment of the present invention.

In FIG. 7, reference numeral 5 represents a frequency control circuit such as a voltage control oscillator which is capable of changing said frequency. The variable frequency range of this frequency control circuit 5 is wider than the shift of the resonant frequency within a pressure range to be measured by a piezoelectric oscillator 6. The output from the frequency control circuit 5 is applied to the piezoelectric oscillator 6, and the output of this oscillator 6 is applied to a current-voltage converter 7. The current-voltage converter 7 generates a voltage proportional to a current flowing through the piezoelectric oscillator 6.

The phase characteristics of the a.c. resistance of the piezoelectric oscillator 6, that is, the impedance, is zero (degree) at the resonance frequency $f_o$ as shown in FIG. 7. Therefore, the phase characteristics of the output voltage of the frequency control circuit 5 are the same as those of the output voltage of the current-voltage converter 7 at the resonant frequency $f_o$, but the output voltage of the current-voltage converter 7 having the same phase as the current flowing through the piezoelectric oscillator 6 lags behind the output voltage of the frequency control circuit 5 at a frequency lower than the resonant frequency.

Therefore, a phase comparator 8 detects the phase difference between the output voltage of the frequency control circuit 5 and the output voltage of the current-voltage converter 7. The phase comparator 8 generates a voltage proportional to the phase difference. This output voltage is in turn applied to a frequency control terminal of the frequency control circuit 5, and a feedback loop is formed so that the frequency of the voltage applied to the piezoelectric oscillator 6 always coincides with the resonant frequency. Reference numeral 9 represents a low-pass filter which is connected to the phase comparator 8. Normally, the low-pass filter 9 is disposed so as to eliminate the high frequency component (noise) of the output of the phase comparator 8 and to stabilize the system.

The a.c. voltage which is always applied to the piezoelectric oscillator and has a frequency equal to the resonant frequency and the output voltage of the current-voltage converter 7 are applied to an operational circuit 13, which calculates the final value of equation (1). The output of this operational circuit is applied to a voltmeter 10, which displays an a.c. resistance value corresponding to the pressure.

We claim:

1. In a barometer of the type which measures pressure from an a.c. resistance value of a piezoelectric oscillator disposed inside a pressure vessel, a barometer consisting essentially of:

a frequency control circuit connected to the input of said piezoelectric oscillator;

a current-voltage converter connected to the output of said piezoelectric oscillator;

a phase comparator connected to the output of said frequency control circuit and to the output of said current-voltage converter;

a voltmeter connected to said current-voltage converter;

a low-pass filter connected to said phase comparator; and input means for applying the output of said low-pass filter to said frequency control circuit;

the a.c. voltage value of said piezoelectric oscillator indicating the ambient pressure of a gas around said piezoelectric oscillator.

2. The barometer as defined in claim 1 which further includes an amplifier detecting a current flowing through said piezoelectric oscillator at resonance by means of a terminal voltage of a resistor connected in series with said piezoelectric oscillator and amplifying the terminal voltage of said resistor, and in which the gas pressure around said piezoelectric oscillator is indicated by the output voltage of said amplifier.

3. The barometer as defined in claim 1 which further includes an operational circuit connected to the output of said frequency control circuit and to the output of said current-voltage converter, and said voltmeter connected to the output of said operational circuit.

* * * * *